Thos. Crispin's Impd Lath Bolter.
Patented Aug 22 1871
No. 118205
Fig. 1.
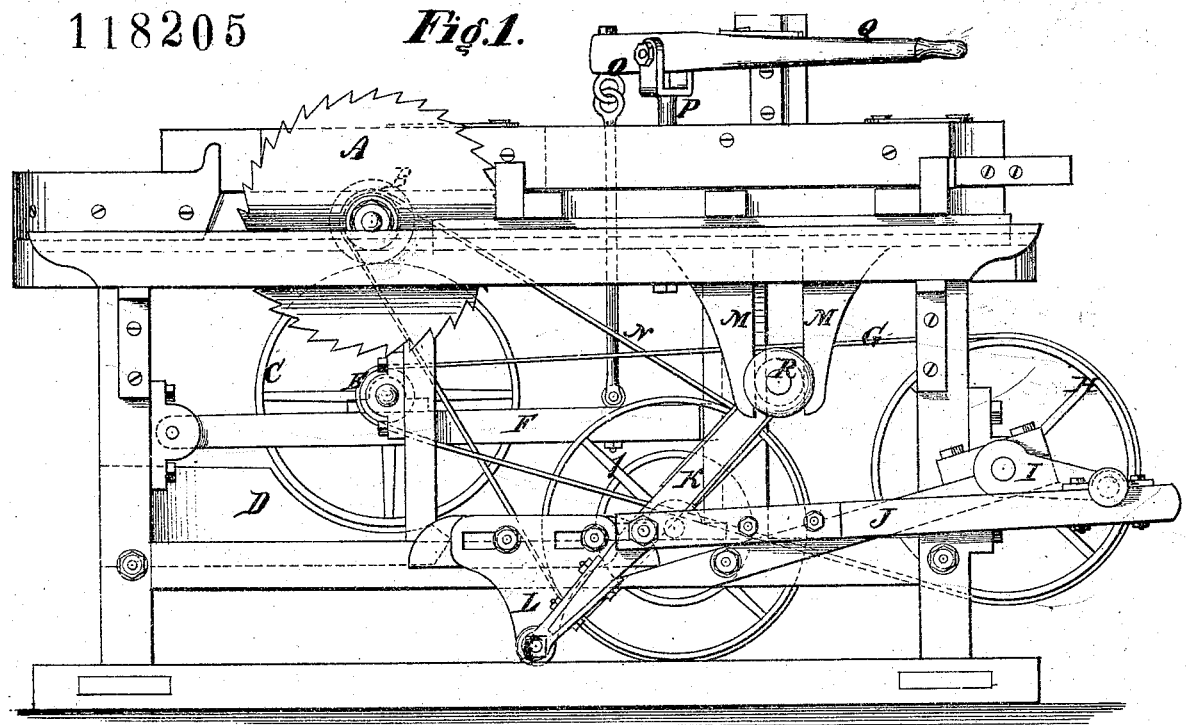
Fig. 2.
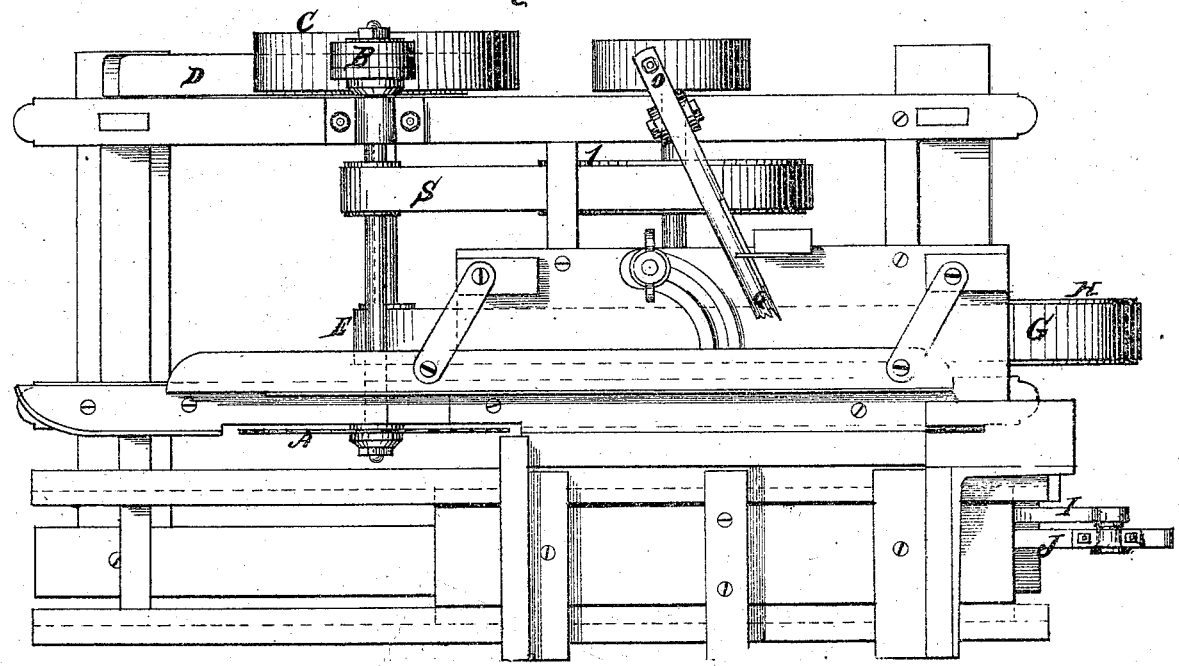
Witnesses:
Alexander Campbell
William A. Kelsey
Fig. 3.
Inventor:
Thomas Crispin

UNITED STATES PATENT OFFICE.

THOMAS CRISPIN, OF BAY CITY, MICHIGAN.

IMPROVEMENT IN MACHINES FOR CUTTING LATH-BOLTS.

Specification forming part of Letters Patent No. 118,205, dated August 22, 1871.

*To all whom it may concern:*

Be it known that I, THOMAS CRISPIN, of Bay City, in the county of Bay and State of Michigan, have invented certain Improvements in Lath-Bolters, of which the following is a specification:

This invention relates to an improvement in lath-bolters; and consists in certain arrangements and combinations hereinafter more fully described and claimed.

Figure 1 is a side elevation of a machine embodying my invention. Fig. 2 is a top and longitudinal view of the same. Fig. 3 is a side and elevated view of the cam or upright, showing one of the rollers or shears at the top.

Fig. 1 is the driving-pulley, from which motion is communicated to the operating parts. A is the saw by which the timber is to be cut. On the tail end of the mandrel upon which the saw is hung is a friction-pulley, B. Directly under said pulley B is a friction-wheel, C, hung on a shaft, one end of which is supported on a movable bridge-tree, F, said wheel C being thrown in and out of gear with pulley B by the lever O, said lever being supported on the fulcrum P and connected to the bridge-tree F by the rod N. On the same shaft with wheel C is a pulley, E, from which a belt, G, runs to the crank-wheel H. To the crank I is attached the pitman J, connecting with the cam or upright K. On the top of said upright is two rollers or sheaves, one of which is shown at R, Fig. 3, and which passes up between the friction-irons M M, underneath the carriage.

The operation of the machine is as follows: The material to be cut is placed upon the carriage, and the gauge adjusted to give the proper thickness, when, a rotating motion being given to the saw A, a reciprocating movement of the carriage is produced through the friction-roller B, pulleys C and H, crank I, and connections J K R. The material may be moved upon the carriage by hand or by any of the automatic devices in common use for similar purposes.

What I claim as my invention, and desire to secure by Letters Patent, is—

1. The combination of pulley H, crank I, connections J K, roller R, and friction-plates M, attached to the carriage, all constructed as and for the purpose specified.

2. The lever Q, fulcrum P, rod N, and lever F, in combination with the friction-pulleys C B and saw-mandrel, as for the purpose hereinbefore set forth.

THOMAS CRISPIN.

Witnesses:
 J. W. MCMAITE,
 ALEXANDER CAMPBELL.